US011365159B2

(12) United States Patent
Matsumoto et al.

(10) Patent No.: US 11,365,159 B2
(45) Date of Patent: Jun. 21, 2022

(54) COATED MEMBER AND METHOD OF MANUFACTURING THE SAME

(71) Applicant: Mitsubishi Heavy Industries Aero Engines, Ltd., Aichi (JP)

(72) Inventors: Mineaki Matsumoto, Tokyo (JP); Takayuki Kurimura, Tokyo (JP); Kosuke Nishikawa, Tokyo (JP); Tadayuki Hanada, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 559 days.

(21) Appl. No.: 15/549,658

(22) PCT Filed: Feb. 9, 2016

(86) PCT No.: PCT/JP2016/053802
§ 371 (c)(1),
(2) Date: Aug. 8, 2017

(87) PCT Pub. No.: WO2016/129591
PCT Pub. Date: Aug. 18, 2016

(65) Prior Publication Data
US 2018/0037515 A1 Feb. 8, 2018

(30) Foreign Application Priority Data

Feb. 9, 2015 (JP) .............................. JP2015-023373

(51) Int. Cl.
*B32B 18/00* (2006.01)
*C04B 41/89* (2006.01)
(Continued)

(52) U.S. Cl.
CPC .............. *C04B 41/89* (2013.01); *B32B 18/00* (2013.01); *C04B 41/009* (2013.01); *C04B 41/52* (2013.01);
(Continued)

(58) Field of Classification Search
None
See application file for complete search history.

(56) References Cited

U.S. PATENT DOCUMENTS 6,296,941 B1 10/2001 Eaton, Jr. et al.
6,312,763 B1 11/2001 Eaton, Jr. et al.
(Continued)

FOREIGN PATENT DOCUMENTS

EP 2503027 A1 9/2012
JP 11-12050 A 1/1999
(Continued)

OTHER PUBLICATIONS

A. J. F. Carrion et al., "Structural and kinetic study of phase transitions in LaYSi2O7", Journal of the European Ceramic Society, vol. 32, Issue 10, pp. 2477-2486, Mar. 2012, 10pp.
(Continued)

*Primary Examiner* — Daniel J. Schleis
(74) *Attorney, Agent, or Firm* — Kanesaka Berner and Partners LLP

(57) ABSTRACT

Provided are a coated member in which damage of a coating film can be suppressed in a high temperature environment and the coating may be performed at low cost, and a method of manufacturing the same. A coated member includes a bond coat and a top coat sequentially laminated on a substrate made of a Si-based ceramic or a SiC fiber-reinforced SiC matrix composite, wherein the top coat includes a layer composed of a mixed phase of a $(Y_{1-a}Ln_{1a})_2Si_2O_7$ solid solution (here, $Ln_1$ is any one of Nd, Sm, Eu, and Gd) and $Y_2SiO_5$ or a $(Y_{1-b}Ln_{1'b})_2SiO_5$ solid solution (here, $Ln_{1'}$ is any one of Nd, Sm, Eu, and Gd), or a mixed phase of a $(Y_{1-c}Ln_{2c})_2Si_2O_7$ solid solution (here, $Ln_2$ is any one of Sc, Yb, and Lu) and $Y_2SiO_5$ or a $(Y_{1-d}Ln_{2'd})_2SiO_5$ solid solution (here, $Ln_{2'}$ is any one of Sc, Yb, and Lu).

9 Claims, 6 Drawing Sheets

(51) Int. Cl.
*C04B 41/87* (2006.01)
*C04B 41/00* (2006.01)
*C04B 41/52* (2006.01)
*C23C 4/02* (2006.01)
*F01D 5/28* (2006.01)
*C23C 4/11* (2016.01)
*C04B 111/00* (2006.01)

(52) U.S. Cl.
CPC ............ *C04B 41/87* (2013.01); *C23C 4/02* (2013.01); *C23C 4/11* (2016.01); *F01D 5/282* (2013.01); *F01D 5/284* (2013.01); *F01D 5/288* (2013.01); *C04B 2111/0025* (2013.01); *F05D 2300/15* (2013.01); *F05D 2300/211* (2013.01); *F05D 2300/6033* (2013.01); *Y02T 50/60* (2013.01)

(56) References Cited

U.S. PATENT DOCUMENTS

| | | |
|---|---|---|
| 6,733,908 B1 | 5/2004 | Lee et al. |
| 6,759,151 B1 | 7/2004 | Lee |
| 7,348,287 B2 | 3/2008 | Mechnich |
| 2003/0087120 A1 | 5/2003 | Torigoe et al. |
| 2003/0138641 A1 | 7/2003 | Fukudome et al. |
| 2004/0156724 A1 | 8/2004 | Torigoe et al. |
| 2004/0175597 A1 | 9/2004 | Litton et al. |
| 2006/0014029 A1* | 1/2006 | Saak ............... C04B 41/009 428/446 |
| 2006/0073361 A1 | 4/2006 | Fukudome et al. |
| 2006/0100086 A1 | 5/2006 | Mechnich |
| 2006/0166015 A1 | 7/2006 | Spitsberg et al. |
| 2007/0151481 A1 | 7/2007 | Akiyama et al. |
| 2008/0160172 A1 | 7/2008 | Taylor et al. |
| 2008/0213617 A1 | 9/2008 | Taylor et al. |
| 2008/0220209 A1 | 9/2008 | Taylor et al. |
| 2009/0220776 A1 | 9/2009 | Meschter et al. |
| 2009/0250153 A1 | 10/2009 | Meschter et al. |
| 2010/0080984 A1 | 4/2010 | Lee |
| 2010/0159151 A1* | 6/2010 | Kirby ............... C04B 41/009 427/452 |
| 2011/0027557 A1 | 2/2011 | Kirby et al. |
| 2011/0256411 A1 | 10/2011 | Courcot et al. |
| 2012/0003102 A1 | 1/2012 | Taylor et al. |
| 2012/0122651 A1 | 5/2012 | Taylor et al. |
| 2012/0244383 A1 | 9/2012 | Meschter et al. |
| 2013/0228105 A1 | 9/2013 | Yamamura et al. |
| 2013/0316891 A1 | 11/2013 | Harada et al. |
| 2013/0330507 A1 | 12/2013 | Taylor et al. |
| 2014/0178632 A1 | 6/2014 | Taylor et al. |
| 2014/0334939 A1 | 11/2014 | Taylor et al. |
| 2016/0003063 A1* | 1/2016 | Rosenzweig ......... C04B 41/009 427/397.7 |
| 2016/0108510 A1* | 4/2016 | Kirby ............... C23C 4/11 428/215 |

FOREIGN PATENT DOCUMENTS

| | | |
|---|---|---|
| JP | 2003-160852 A | 6/2003 |
| JP | 2005-154885 A | 6/2005 |
| JP | 2006-28015 A | 2/2006 |
| JP | 2006-151720 A | 6/2006 |
| JP | 2006-200037 A | 8/2006 |
| JP | 3866002 B2 | 1/2007 |
| JP | 2007-91504 A | 4/2007 |
| JP | 2008-308374 A | 12/2008 |
| JP | 4453718 B2 | 4/2010 |
| JP | 2011-46598 A | 3/2011 |
| JP | 4690709 B2 | 6/2011 |
| JP | 2012-82994 A | 4/2012 |
| JP | 2012-513946 A | 6/2012 |
| JP | 5112681 B2 | 1/2013 |
| JP | 2015-172243 A | 10/2015 |
| WO | 2012/077787 A1 | 6/2012 |

OTHER PUBLICATIONS

F. Monteverde et al., "Structural data from X-ray powder diffraction for new high-temperature phases (Y1-xLnx) 2Si2O7 with Ln=Ce, Pr, Nd", Journal of the European Ceramic Society, vol. 22, Issue 5, pp. 721-730, May 2002,10pp.

Q. Y. Zhang et al., "Effects of composition and structure on spectral properties of Eu3+-doped yttrium silicate transparent nanocrystalline films by metallorganic decomposition method", Chemical Physics Letters, vol. 356, Issues 1-2, pp. 161-167, Apr. 2002, 7pp.

N. Maier et al., "Formation and stability of Gd, Y, Yb and Lu disilicates and their solid solutions", Journal of Solid State Chemistry, vol. 179, No. 6, pp. 1630-1635, Mar. 2006, 6pp.

International Search Report in PCT/JP2016/053786, dated Mar. 8, 2016. 5pp.

International Search Report in PCT/JP2016/053802, dated Mar. 8, 2016. 5pp.

Written Opinion of the International Searching Authority in PCT/JP2016/053786, dated Mar. 8, 2016. 10pp.

Written Opinion of the International Searching Authority in PCT/JP2016/053802, dated Mar. 8, 2016. 10pp.

Extended European Search Report in EP Application No. 16749232.1, dated Dec. 13, 2017. 10pp.

* cited by examiner

COATED MEMBER AND METHOD OF MANUFACTURING THE SAME

RELATED APPLICATIONS

The present application is a National Phase of International Application No. PCT/JP2016/053802, filed Feb. 9, 2016, and claims priority based on Japanese Patent Application No. 2015-023373, filed Feb. 9, 2015.

TECHNICAL FIELD

The present invention relates to a coated member and a method of manufacturing the same, and more particularly, to a coated member on which environmental barrier coating is performed.

BACKGROUND ART

Since a silicon-based ceramic such as SiC, $Si_3N_4$, or the like, or a SiC fiber-reinforced SiC matrix composite (CMC) has excellent mechanical properties at a high temperature, the silicon-based ceramic or the SiC fiber-reinforced SiC matrix composite is a promising material as a high-temperature member for aircraft engines or power generation gas turbines. However, for example, since in a gas turbine combustion environment, a gas turbine is operated in a high-temperature and high-pressure steam oxidation environment in which steam is present, the silicon-based ceramic or the SiC fiber-reinforced SiC matrix composite becomes corroded and thinned due to steam while being oxidized, such that durability is remarkably deteriorated.

Therefore, in order to put the silicon-based ceramic or the SiC fiber-reinforced SiC matrix composite into practice in the gas turbine, or the like, environmental barrier coating is performed on a surface of the silicon-based ceramic or the SiC fiber-reinforced SiC matrix composite. A coating made of yttrium silicate is disclosed in Patent Document 1. A coating made of $Lu_2Si_2O_7$ is disclosed in Patent Document 2.

A coating made of a monosilicate of a rare earth element such as Lu, Yb, or Y (that is, a rare earth monosilicate), a disilicate of the rare earth element (that is, a rare earth disilicate), or a combination thereof is disclosed in Patent Document 3. In the technology in Patent Document 3, after a coating film of the rare earth monosilicate is formed on a substrate and subjected to heat-treatment in environment containing oxygen, thereby partially converting the rare earth monosilicate to the rare earth disilicate.

CITATION LIST

Patent Literature

{PTL 1}
The publication of Japanese Patent No. 3866002
{PTL 2}
The publication of Japanese Patent No. 4690709
{PTL 3}
Japanese Unexamined Patent Application Publication No. 2006-28015

SUMMARY OF INVENTION

Technical Problem

Since $Y_2Si_2O_7$ is a relatively cheap material among rare earth silicates, $Y_2Si_2O_7$ is advantageous as a coating material of large machines such as aircraft engines, gas turbines for power generation, and the like. A thermal expansion coefficient of $Y_2Si_2O_7$ is $3.7 \times 10-6/K$ and is close to a thermal expansion coefficient ($3.5 \times 10^{-6}/K$ to $4.5 \times 10^{-6}/K$) of a SiC fiber-reinforced SiC matrix composite. Therefore, it is possible to alleviate thermal stress during use at a high temperature. However, since phase transformation of $Y_2Si_2O_7$ ($\gamma \rightarrow \beta$) accompanied with a volume change can occur in the vicinity of 1300° C., coating can be damaged during use at the high temperature.

Meanwhile, β phases of $Lu_2Si_2O_7$ and $Yb_2Si_2O_7$ are stably present up to a high temperature of 1400° C. or more, such that phase transformation does not occur. However, since materials containing these rare earth elements are expensive, there has been a problem in that high cost is required for coating a member having a large area.

In the method disclosed in Patent Document 3, a plurality of rare earth disilicates ($Lu_2Si_2O_7$, $Yb_2Si_2O_7$, and $Y_2Si_2O_7$) are in a state in which heterogeneous crystals are merely mixed with each other, but is not in a state (solid solution) in which the rare earth elements are uniformly distributed to exist as the same phase. In this case, there is a problem in that phase stability of $Y_2Si_2O_7$ is not improved.

An object of the present invention is to provide a coated member which has high reliability by suppressing damage of a coating film in a high temperature environment, and in which the coating is performed at low cost, and a method of manufacturing the same.

Solution to Problem

According to a first aspect of the present invention, there is provided a coated member including: a bond coat and a top coat sequentially laminated on a substrate made of a silicon (Si)-based ceramic or a SiC fiber-reinforced SiC matrix composite, wherein the top coat includes a first layer composed of a mixed phase of a rare earth disilicate and a rare earth monosilicate, the rare earth disilicate being a $(Y_{1-a}Ln_{1a})_2Si_2O_7$ solid solution (here, $Ln_1$ is any one of Nd, Sm, Eu, and Gd, a is 0.1 or more and 0.5 or less when $Ln_1$ is Nd, Sm, or Eu, and a is 0.2 or more and 0.5 or less when $Ln_1$ is Gd), and the rare earth monosilicate being $Y_2SiO_5$ or a $(Y_{1-b}Ln_{1'b})_2SiO_5$ solid solution (here, $Ln_{1'}$ is any one of Nd, Sm, Eu, and Gd, and b is more than 0 and equal to or less than 0.5).

According to a second aspect of the present invention, there is provided a coated member including: a bond coat and a top coat sequentially laminated on a substrate made of a Si-based ceramic or a SiC fiber-reinforced SiC matrix composite, wherein the top coat includes a first layer composed of a mixed phase of a rare earth disilicate and a rare earth monosilicate, the rare earth disilicate being a $(Y_{1-c}Ln_{2c})_2Si_2O_7$ solid solution (here, $Ln_2$ is any one of Sc, Yb, and Lu, c is 0.05 or more and 0.5 or less when $Ln_2$ is Sc, and c is 0.1 or more and 0.5 or less when $Ln_2$ is Yb or Lu), and the rare earth monosilicate being $Y_2SiO_5$ or a $(Y_{1-d}Ln_{2'd})_2SiO_5$ solid solution (here, $Ln_{2'}$ is any one of Sc, Yb, and Lu, and d is more than 0 and equal to or less than 0.5).

A stable region of an α phase is expanded by partially substituting Y in $Y_2Si_2O_7$ with Nd, Sm, Eu, or Gd at the above-mentioned ratio. A stable region of a P phase is expanded by partially substituting Y in $Y_2Si_2O_7$ with Sc, Yb, or Lu at the above-mentioned ratio. Therefore, in the rare earth disilicates having the compositions defined in the first and second aspects, phase transformation does not occur even at a high temperature of about 1300° C. to 1400° C. Therefore, in the case of applying the coated member to a coating of aircraft engines or gas turbines, damage of a coating film due to a volume change accompanying phase transformation can be prevented.

Generally, a thermal expansion coefficient of a rare earth monosilicate is higher than that of a rare earth disilicate. A thermal expansion coefficient of a mixed phase of the rare earth monosilicate and the rare earth disilicate is changed depending on a mixing ratio. When a difference in thermal expansion coefficient between a substrate and a top coat is large, distortion can occur in the top coat, and thus, the top coat can be damaged. The mixed phase of the rare earth monosilicate and the rare earth disilicate is used in the top coat as in the present invention, thereby making it possible to adjust a thermal expansion coefficient so as to prevent the coating from being damaged by thermal stress.

In the first and second aspect, it is preferable that the top coat has a second layer on the first layer, and the second layer is made of $Re_2SiO_3$ (here, Re is a rare earth element).

The rare earth monosilicate has a low activity of $SiO_2$ as compared to the rare earth disilicate. Therefore, the rare earth monosilicate has excellent steam resistance. Steam resistance of the top coat can be further improved by forming a rare earth monosilicate layer as a second layer.

In the first and second aspect, it is preferable that a difference between a thermal expansion coefficient of the substrate on which the bond coat is laminated and a thermal expansion coefficient of the first layer is $3 \times 10^{-6}$/K or less.

In the first and second aspect, it is preferable that a difference between a thermal expansion coefficient of the first layer and a thermal expansion coefficient of the second layer is $3 \times 10^{-6}$/K or less.

When a difference in the thermal expansion coefficient between the substrate and the first layer is $3 \times 10^{-6}$/K or less, thermal stress can be alleviated, thereby making it possible to prevent the first layer from being damaged. In the case in which the top coat is composed of two layers, when a difference in the thermal expansion coefficient between the first and second layers is $3 \times 10^{-6}$/K or less, it is possible to prevent the first and second layers from being damaged by thermal stress.

According to a third aspect of the present invention, there is provided a method of manufacturing a coated member, the method including: forming a bond coat on a substrate made of a Si-based ceramic or a SiC fiber-reinforced SiC matrix composite; and forming a top coat on the bond coat, wherein the forming of the top coat includes: preparing spray particles by mixing rare earth disilicate powder made of a $(Y_{1-a}Ln_{1a})_2Si_2O_7$ solid solution (here, $Ln_1$ is any one of Nd, Sm, Eu, and Gd, when $Ln_1$ is Nd, Sm, or Eu, a is 0.1 or more and 0.5 or less, and when $Ln_1$ is Gd, a is 0.2 or more and 0.5 or less) and rare earth monosilicate powder made of $Y_2SiO_5$ or a $(Y_{1-b}Ln_{1'b})_2SiO_5$ solid solution (here, $Ln_{1'}$ is any one of Nd, Sm, Eu, and Gd, and b is more than 0 and equal to or less than 0.5) to each other; and forming a first layer composed of a mixed phase of the rare earth disilicate and the rare earth monosilicate by spraying the spray particles on a surface of the bond coat.

According to a fourth aspect of the present invention, there is provided a method of manufacturing a coated member, the method including: forming a bond coat on a substrate made of a Si-based ceramic or a SiC fiber-reinforced SiC matrix composite; and forming a top coat on the bond coat, wherein the forming of the top coat includes: preparing spray particles by mixing rare earth disilicate powder made of a $(Y_{1-c}Ln_{2c})_2Si_2O_7$ solid solution (here, $Ln_2$ is any one of Sc, Yb, and Lu, when $Ln_2$ is Sc, c is 0.05 or more and 0.5 or less, and when $Ln_2$ is Yb or Lu, c is 0.1 or more and 0.5 or less) and rare earth monosilicate powder made of $Y_2SiO_5$ or a $(Y_{1-d}Ln_{2'd})_2SiO_5$ solid solution (here, $Ln_{2'}$ is any one of Sc, Yb, and Lu, and b is more than 0 and equal to or less than 0.5); and forming a first layer composed of a mixed phase of the rare earth disilicate and the rare earth monosilicate by spraying the spray particles on a surface of the bond coat.

As described above, the rare earth disilicate represented by the $(Y_{1-a}Ln_{1a})_2Si_2O_7$ solid solution (here, $Ln_1$ is any one of Nd, Sm, Eu, and Gd) or $(Y_{1-c}Ln_{1c})_2Si_2O_7$ solid solution (here, $Ln_2$ is any one of Sc, Yb, and Lu) has excellent phase stability at a high temperature.

According to the present aspect, since rare earth disilicate particles previously solid-solutionized are used in spray particles, a top coat in which rare earth elements are uniformly distributed can be formed. As a result, phase stability of the rare earth disilicate is improved, and a lifespan of the coating film can be extended.

In the third and fourth aspect, it is preferable that the forming of the top coat includes forming a second layer by spraying particles made of $Re_2SiO_5$ (here, Re is a rare earth element) on a surface of the first layer.

Steam resistance can be further improved by forming a rare earth monosilicate layer as a second layer.

In the third and fourth aspect, it is preferable that the rare earth disilicate powder and the rare earth monosilicate powder are mixed at a mixing ratio at which a difference between a thermal expansion coefficient of the substrate on which the bond coat is laminated and a thermal expansion coefficient of the first layer is $3 \times 10^{-6}$/K or less.

In the third and fourth aspect, it is preferable that the rare earth disilicate powder and the rare earth monosilicate powder are mixed at a mixing ratio at which a difference between a thermal expansion coefficient of the first layer and a thermal expansion coefficient of the second layer is $3 \times 10^{-6}$/K or less.

A thermal expansion coefficient of a mixed phase of the rare earth monosilicate and the rare earth disilicate is changed depending on a mixing ratio. According to the present aspect, since the first layer is formed using particles prepared by adjusting the mixing ratio of the rare earth monosilicate and the rare earth disilicate so that the difference in the thermal expansion coefficient between the first layer and the second layer is $3 \times 10^{-6}$/K or less, it is possible to prevent the first layer from being damaged.

When the top coat is composed of two layers, the first layer is formed using the particles prepared by adjusting the mixing ratio of the rare earth monosilicate and the rare earth disilicate so that the difference in the thermal expansion coefficient between the first layer and the second layer is $3 \times 10^{-6}$/K or less. This can prevent the first and second layers from being damaged.

Advantageous Effects of Invention

In a coated member obtained according to the present invention, even though the coated member is used under a steam oxidation environment at a high temperature of about 1300° C. to 1400° C. and a high pressure, a volume change accompanied with phase transformation of a top coat and damage by steam erosion can be prevented. Damage of the top coat can be prevented by adjusting a thermal expansion coefficient of a first layer of the top coat to suppress thermal stress generated in the coated member.

DESCRIPTION OF EMBODIMENTS

First Embodiment

Figure 1:
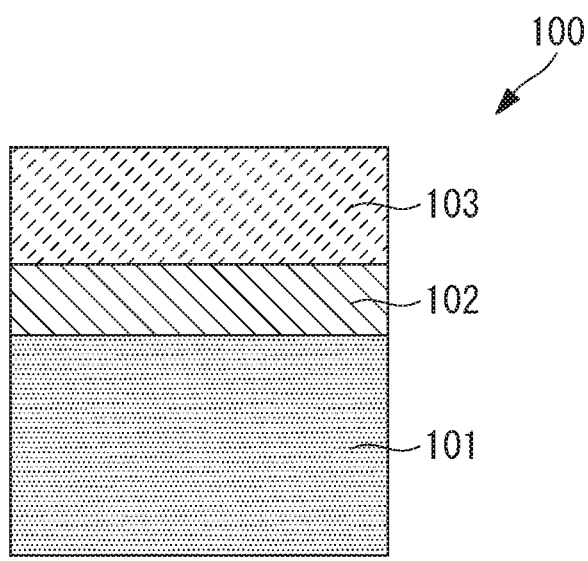
FIG. 1 is a schematic cross-sectional view of a coated member according to a first embodiment.

FIG. 1 is a schematic cross-sectional view of a coated member according to a first embodiment. A coated member 100 can be formed by sequentially laminating a bond coat 102 and a top coat 103 on a substrate 101.

The substrate 101 is a turbine member of an aircraft engine, or a gas turbine member for power generation such as a shroud, a combustion liner, or the like. The substrate 101 is made of a silicon (Si)-based ceramic or a SiC fiber-reinforced SiC matrix composite (CMC). The Si-based ceramic is a ceramic containing Si such as SiC, $Si_3N_4$, or the like. The SiC fiber-reinforced SiC matrix composite is a matrix composite in which SiC fiber is used as reinforcing fiber and SiC is used as a matrix.

The bond coat 102 is formed on a surface of the substrate 101. The bond coat 102 is to secure good adhesion between the substrate 101 and the top coat 103. The bond coat 102 is made of silicide such as Si, $MoSi_2$, $LuSi_2$, or the like, mullite ($3Al_2O_3$-$2SiO_2$), barium strontium aluminosilicate (BSAS, $(Ba_{1-x}Sr_x)O$—$Al_2O_3$—$SiO_2$), or the like. The bond coat 102 can be made of one of the above-mentioned materials. A thickness of the bond coat 102 is 20 μm or more and 200 μm or less.

The bond coat 102 is formed by a spray method, a sintering method, or the like.

The top coat 103 is formed on the bond coat 102. The top coat 103 according to the present embodiment is composed of a mixed phase of a rare earth disilicate and a rare earth monosilicate. A thickness of the top coat 103 is 20 μm or more and 400 μm or less.

Figure 2:
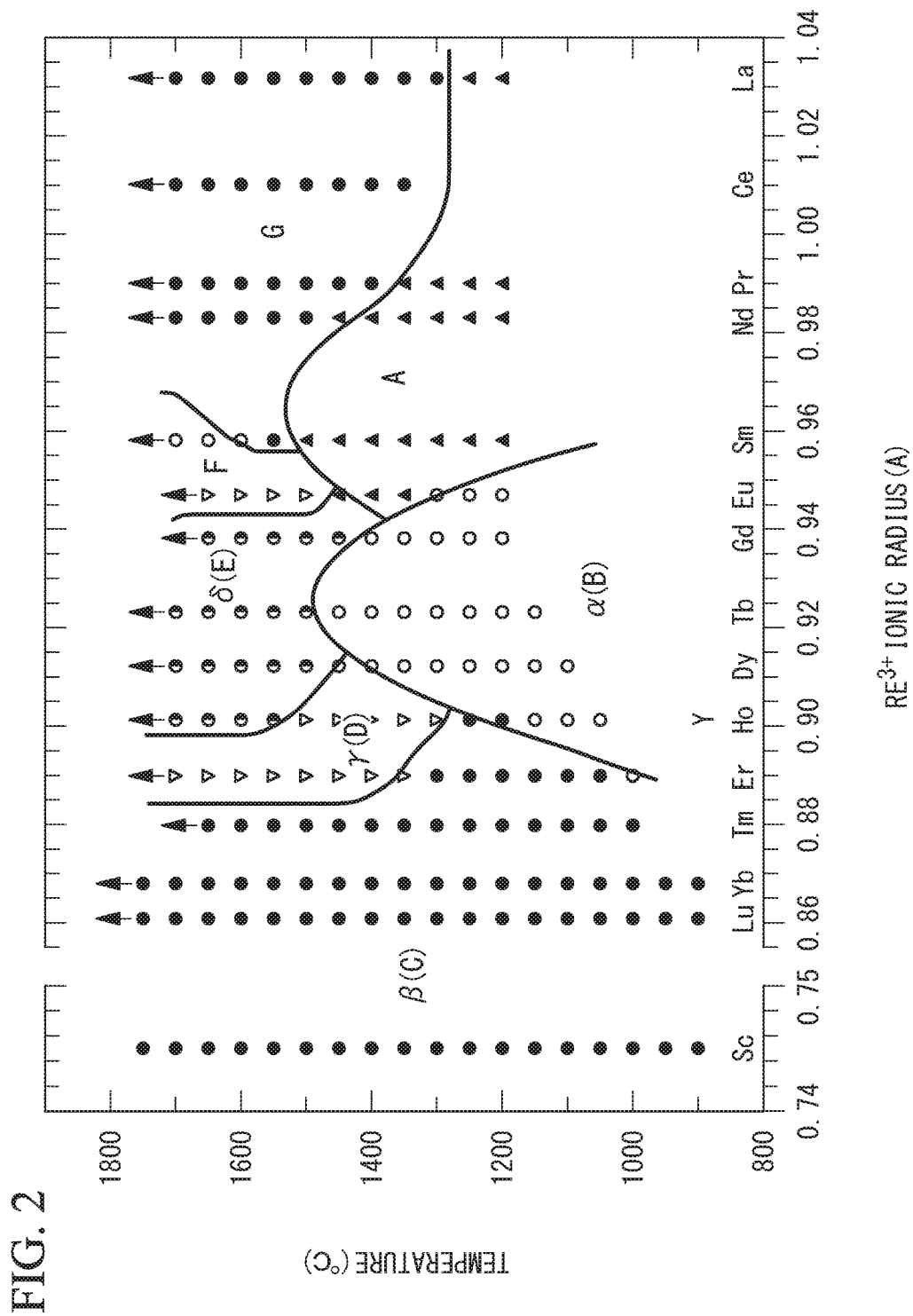
FIG. 2 is a graph illustrating a relationship between a temperature and a crystal structure of a rare earth disilicate.

FIG. 2 is a graph illustrating a relationship between a temperature and a crystal structure of a rare earth disilicate (Reference of the graph: A. J. F. Carrion et al., "Structural and kinetic study of phase transitions in $LaYSi_2O_7$", Journal of the European Ceramic Society, Vol. 32 (2012) PP. 2477-2486, a boundary line of the crystal structure is added by the present inventor). In FIG. 2, a horizontal axis indicates an ionic radius of a rare earth element, and a vertical axis indicates a temperature.

An ionic radius of $Y^{3+}$ is 0.90 Å, and referring to FIG. 2, phase transition (γ phase→β phase) occurs at about 1280° C. That is, when the coated member is used in a temperature environment higher than 1300° C., phase transformation accompanied with a volume change is generated by repetitive cooling and heating. Therefore, cracks occur in the top coat 103 due to phase transformation of $Y_2SiO_7$.

In the case in which a rare earth element has an ionic radius larger than that of Y, there is a boundary between an α phase and a γ phase as illustrated in FIG. 2. Referring to FIG. 2, an ionic radius on a boundary line between the α phase and the γ phase at 1300° C. is 0.905 Å. That is, when the ionic radius of the rare earth element is 0.905 Å or more, crystal stability of the rare earth disilicate can be secured up to 1300° C. An ionic radius on a boundary line between the α phase and the γ phase at 1400° C. is 0.91 Å. That is, when the ionic radius of the rare earth element is 0.91 Å or more, crystal stability of the rare earth disilicate can be secured up to 1400° C.

In order to allow an average ionic radius to be larger than that of Y, Y is substituted with a rare earth element having an ionic radius larger than that of Y. As a difference in ionic radius between a rare earth element and Y is increased, an effect of changing an average ionic radius of the rare earth elements is increased. Therefore, it is advantageous to select an element having an ionic radius larger than that of Gd in FIG. 2. Meanwhile, Pr, Ce, and La have high reactivity with steam, such that steam resistance of the coating film is deteriorated. Therefore, Gd, Eu, Sm, and Nd are suitable as a substitution element of Y.

Table 1 illustrates a substitution amount of a substitution element (Gd, Eu, Sm, or Nd) in the $(Y_{1-a}Ln_{1a})_2Si_2O_7$ solid solution and an average ionic radius of the rare earth elements.

TABLE 1

| | Substitution Element | | | |
|---|---|---|---|---|
| a | Nd | Sm | Eu | Gd |
| 0 | 0.9 | 0.9 | 0.9 | 0.9 |
| 0.1 | 0.908 | 0.906 | 0.905 | 0.9038 |
| 0.2 | 0.917 | 0.912 | 0.909 | 0.9076 |
| 0.3 | 0.925 | 0.917 | 0.914 | 0.9114 |
| 0.4 | 0.933 | 0.923 | 0.919 | 0.9152 |
| 0.5 | 0.942 | 0.929 | 0.924 | 0.919 |

According to Table 1, the average ionic radius is to be 0.905 Å or more if a is 0.1 or more for Nd, Sm, or Eu, and 0.2 or more for Gd. That is, when a is equal to or higher than the above-mentioned range, the coated member can withstand an operation temperature up to 1300° C.

Further, according to Table 1, the average ionic radius is to be 0.91 Å or more if a is 0.2 or more for Nd or Sm, and 0.3 or more for Eu or Gd. That is, when a is equal to or higher than the above-mentioned range, the coated member can withstand an operation temperature up to 1400° C.

Meanwhile, if a is large, an amount of the substitution element is increased. Therefore, in consideration of raw material cost, cost for substitution is increased by using Nd, Sm, Eu, and Gd, which are expensive elements. Therefore, there is an upper limit in the substitution amount of Nd, Sm, Eu, or Gd. In detail, it is preferable that an upper limit of a is 0.5.

Referring to FIG. 2, an ionic radius on a boundary line between the β phase and the γ phase at 1300° C. is 0.897 Å. That is, when the ionic radius of the rare earth element is 0.897 Å or less, crystal stability of the rare earth disilicate can be secured up to 1300° C. An ionic radius on a boundary line between the β phase and the γ phase at 1400° C. is 0.885 Å. That is, when the ionic radius of the rare earth element is 0.885 Å or less, crystal stability of the rare earth disilicate can be secured up to 1400° C.

In the $(Y_{1-c}Ln_{2c})_2Si_2O_7$ solid solution in which Y is substituted with a separate rare earth element, an average ionic radius of rare earth elements (Y and $Ln_2$) is changed depending on a substitution amount. In order to allow the average ionic radius to be smaller than that of Y, Y is substituted with a rare earth element having an ionic radius smaller than that of Y. Referring to FIG. 2, the elements having an ionic radius smaller than that of Y are Sc, Yb, Lu, Tm, and Er. Particularly, in the cases of Sc, Yb, and Lu, the ionic radius is small as compared to Y, and a β phase of disilicate is stably present up to a high temperature.

Table 2 illustrates a substitution amount of a substitution element (Sc, Yb, or Lu) in the $(Y_{1-c}Ln_{2c})_2Si_2O_7$ solid solution and an average ionic radius of the rare earth elements.

TABLE 2

| | Substitution Element | | |
|---|---|---|---|
| c | Sc | Yb | Lu |
| 0 | 0.9 | 0.9 | 0.9 |
| 0.05 | 0.892 | 0.898 | 0.898 |
| 0.1 | 0.885 | 0.897 | 0.897 |
| 0.2 | 0.869 | 0.894 | 0.894 |
| 0.3 | 0.854 | 0.89 | 0.89 |
| 0.4 | 0.838 | 0.887 | 0.887 |
| 0.5 | 0.823 | 0.884 | 0.884 |

According to Table 2, the average ionic radius is to be 0.897 Å or less if c is 0.05 or more for Sc, and 0.1 or more for Yb or Lu. That is, when c is equal to or higher than the above-mentioned range, the coated member can withstand an operation temperature of 1300° C.

Further, according to Table 2, the average ionic radius is to be 0.885 Å or less if c is 0.1 or more for Sc, and 0.5 or more for Yb or Lu. That is, when c is equal to or higher than the above-mentioned range, the coated member can withstand an operation temperature of 1400° C. or more.

Meanwhile, if c is large, an amount of the substitution element is increased. Therefore, in consideration of raw material cost, cost for substitution is increased by using Sc, Yb, and Lu, which are expensive elements. Therefore, there is an upper limit in the substitution amount of Sc, Yb, or Lu. In detail, it is preferable that an upper limit of c is 0.5.

When the rare earth disilicate is $(Y_{1-a}Ln_{1a})_2Si_2O_7$, the rare earth monosilicate according to the present embodiment is $Y_2SiO_5$ or a $(Y_{1-b}Ln_{1'b})_2SiO_5$ solid solution (here, b>0). It is preferable that the substitution element $Ln_{1'}$ of Y is the same as the substitution element of the rare earth disilicate. In detail, $Ln_{1'}$ is any one of Nd, Sm, Eu, and Gd.

As the rare earth monosilicate, $Y_2SiO_5$ (substitution amount b=0) can also be used, but in order to prevent concentrations of the rare earth element from being changed by interdiffusion with the rare earth disilicate, $(Y_{1-a}Ln_{1a})_2Si_2O_7$, coexisting in the mixed phase, it is preferable that the substitution amount b is the same as the substitution amount a of the rare earth disilicate. Therefore, the upper limit of the substitution amount b is 0.5. It is preferable that when the substitution element is Nd, Sm, or Eu, a lower limit of the substitution amount b is 0.1, and when the substitution element is Gd, the lower limit of the substitution amount b is 0.2.

When the rare earth disilicate is $(Y_{1-c}Ln_{2c})_2Si_2O_7$, the rare earth monosilicate is $Y_2SiO_5$ or a $(Y_{1-d}Ln_{2'd})_2SiO_5$ solid solution (here, d>0). It is preferable that the substitution element $Ln_{2'}$ of Y is the same as the substitution element of the rare earth disilicate. In detail, $Ln_{2'}$ is any one of Yb, Lu, and Sc.

As the rare earth monosilicate, $Y_2SiO_5$ (substitution amount d=0) can also be used, but in order to prevent concentrations of the rare earth elements from being changed by interdiffusion with the rare earth disilicate, $(Y_{1-c}Ln_{2c})_2Si_2O_7$, coexisting in the mixed phase, it is preferable that the substitution amount d is the same as the substitution amount c of the rare earth disilicate. Therefore, the upper limit of the substitution amount d is 0.5. It is preferable that when the substitution element is Sc, a lower limit of the substitution amount d is 0.05, and when the substitution element is Yb or Lu, the lower limit of the substitution amount d is 0.1.

The top coat 103 is formed by a spray method. In the present embodiment, as spray particles, particles made of a mixture of rare earth disilicate powder and rare earth monosilicate powder are used.

The spray particles are prepared by the following method. First, particles of the rare earth disilicate solid solution having the above mentioned composition are prepared. As raw material powders, $SiO_2$ powder, $Y_2O_3$ powder, $[Ln_1]_2O_3$ powder (here, $Ln_1$ is any one of Nd, Sm, Eu, and Gd), $[Ln_2]_2O_3$ powder (here, $Ln_2$ is any one of Sc, Yb, and Lu) are weighed and mixed with each other so as to have a predetermined composition.

Alternatively, $Y_2Si_2O_7$ powder and $Ln_2Si_2O_7$ powder (here, Ln is any one of Sc, Yb, and Lu or any one of Nd, Sm, Eu, and Gd) are weighed and mixed with each other so as to have a predetermined composition.

Solid solution formation by heat-treatment can be promoted by using fine powders having a particle size of 1 µm or less as the raw material powders. Therefore, it is possible to decrease a heat-treatment time while removing unreacted particles.

A solid solution powder is obtained by performing heat-treatment on the mixed powders. As a method of preparing the solid solution powder, there is a method of performing heat-treatment at 1300° C. or more using an electric furnace, a method of performing plasma heat-treatment, a method of melting the raw material powders and grinding the obtained melt, or the like.

The rare earth monosilicates represented by $Y_2SiO_5$, $(Y_{1-b}Ln_{1'b})_2SiO_5$ (solid solution), and $(Y_{1-d}Ln_{2'd})_2SiO_5$ (solid solution) are also prepared by the same method as described above.

The rare earth disilicate powder and the rare earth monosilicate powder prepared by the above-mentioned method are weighed and granulated so as to have a predetermined composition ratio. The particles obtained as described above are classified, and particles having a size of 10 µm to 200 µm are used as the spray particles.

Spray powders of $Y_2Si_2O_7$, a $(Y_{0.8}Gd_{0.2})_2Si_2O_7$ solid solution, a $(Y_{0.8}Yb_{0.2})_2Si_2O_7$ solid solution were prepared. Further, a spray coating film was manufactured using these powders.

Figure 3:
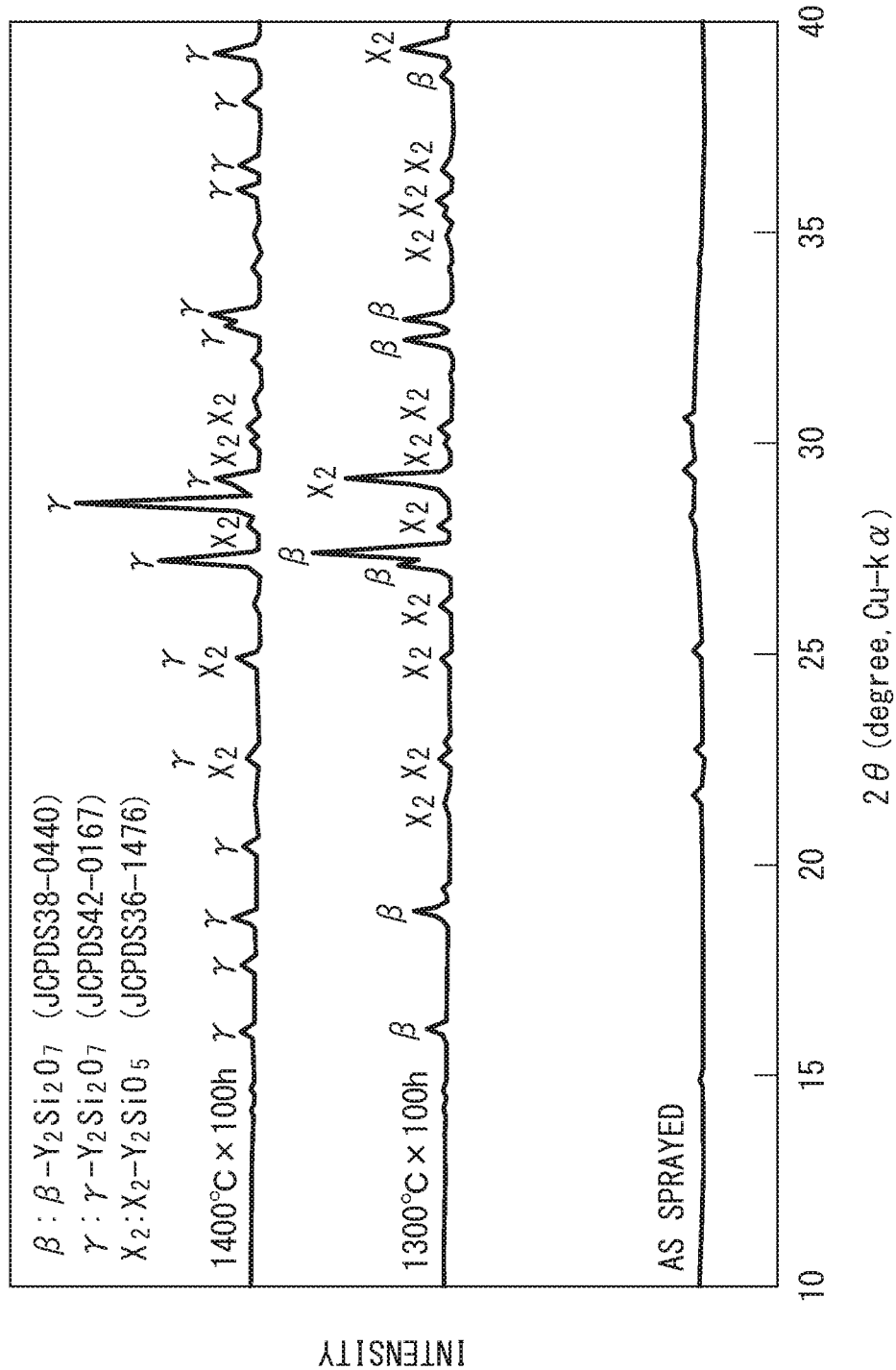
FIG. 3 is a view illustrating a change in crystal structure of a $Y_2Si_2O_7$ spray coating film by heat-treatment.

The manufactured spray coating film was heat treated at 1300° C. for 100 hours and at 1400° C. for 100 hours, and a change in crystal phase was determined by X-ray diffraction (XRD). As illustrated in FIG. 3, in the case of $Y_2Si_2O_7$, a coating film was amorphous in the as-sprayed state, and after heat-treatment at 1300° C. for 100 hours, the coating film was composed of a β-$Y_2Si_2O_7$ phase and an $X_2$—$Y_2SiO_5$ phase. After heat-treatment at 1400° C. for 100 hours, the coating film was composed of two phases, that is, a γ-$Y_2Si_2O_7$ phase and the $X_2$—$Y_2SiO_5$ phase. Therefore, it may be appreciated that at 1300° C. or more, phase transformation from β-$Y_2Si_2O_7$ to γ-$Y_2Si_2O_7$ occurred.

Figure 4:
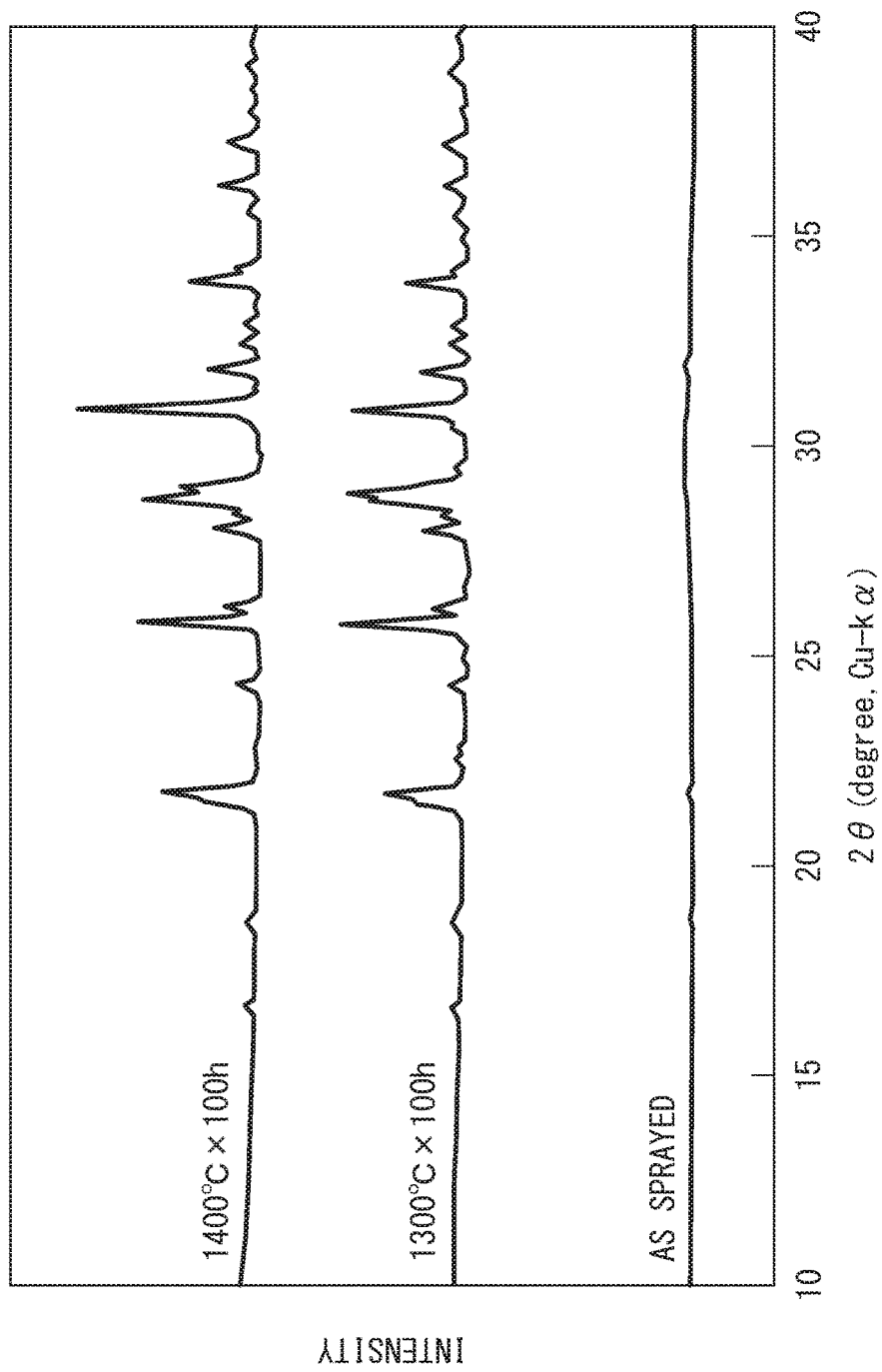
FIG. 4 is a view illustrating a change in crystal structure of a $(Y_{0.8}Gd_{0.2})_2Si_2O_7$ solid solution spray coating film by heat-treatment.

Meanwhile, FIG. 4 illustrates the results obtained by heat-treating a spray coating film of the $(Y_{0.8}Gd_{0.2})_2Si_2O_7$ solid solution in which Y was partially substituted with Gd at 1300° C. for 100 hours and at 1400° C. for 100 hours. It may be appreciated that in the cases of heat-treatment at 1300° C. for 100 hours and at 1400° C. for 100 hours, there was almost no change in a diffraction peak, and thus, phase transformation was suppressed.

Figure 5:
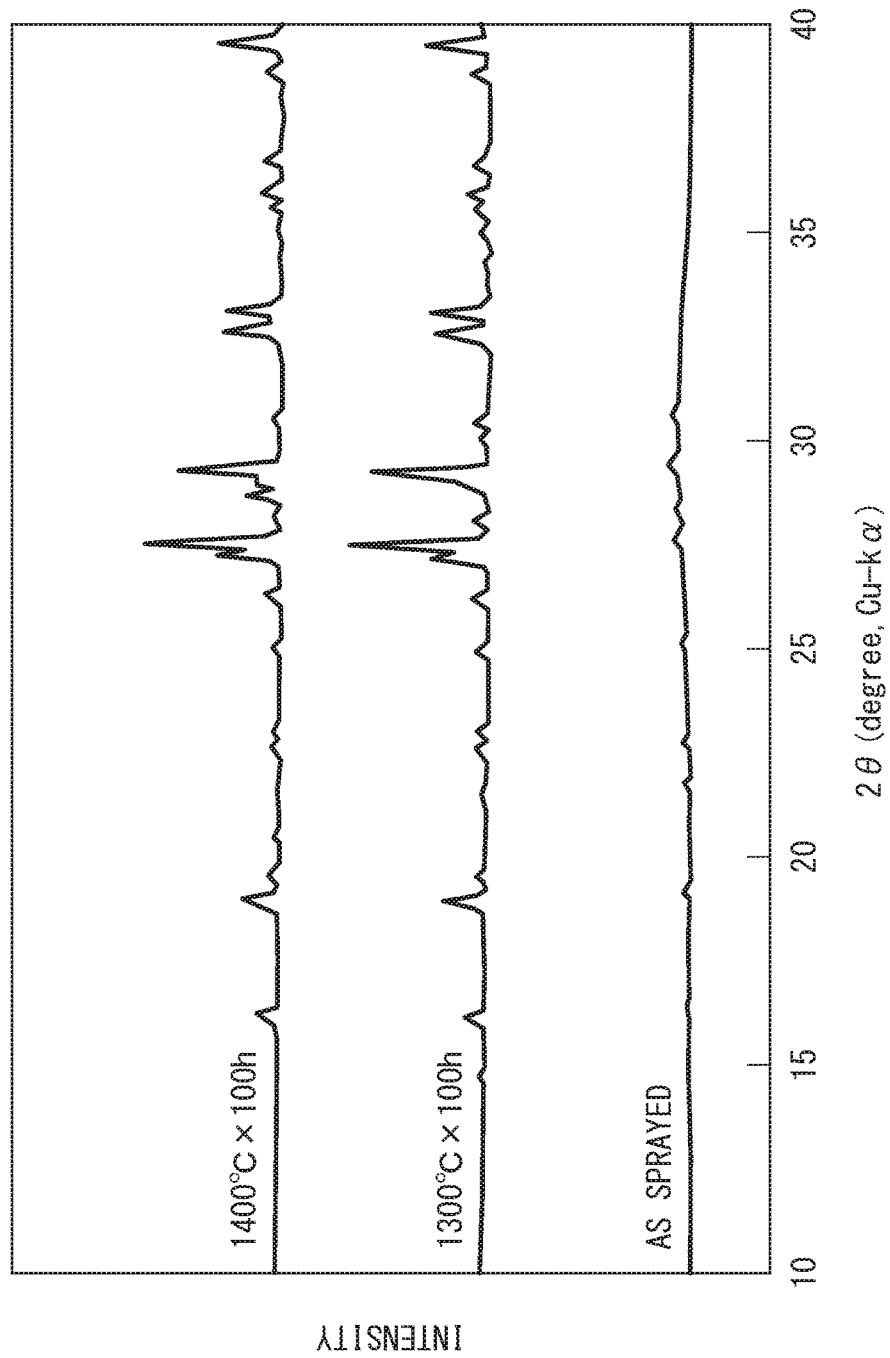
FIG. 5 is a view illustrating a change in crystal structure of a $(Y_{0.8}Yb_{0.2})_2Si_2O_7$ solid solution spray coating film by heat-treatment.

Meanwhile, FIG. 5 illustrates the results obtained by heat-treating a spray coating film of the $(Y_{0.8}Yb_{0.2})_2Si_2O_7$ solid solution in which Y was partially substituted with Yb at 1300° C. for 100 hours and at 1400° C. for 100 hours. It may be appreciated that in the cases of heat-treatment at 1300° C. for 100 hours and at 1400° C. for 100 hours, there was almost no change in a diffraction peak, and thus, in this case, phase transformation was suppressed.

The mixing ratio of the rare earth disilicate powder and the rare earth monosilicate powder is determined in consideration of a thermal expansion coefficient of the top coat. In the coated member 100 according to the present embodiment corresponding to a laminate, when a difference in thermal expansion coefficient between the top coat 103 and a base of the top coat 103 is large, thermal stress is generated in the top coat 103. Cracks, or the like, can occur in the top coat 103 due to thermal stress generated in the top coat 103 by repeating operation and stop of equipment (aircraft engine or gas turbine).

In order to alleviate thermal stress in the top coat 103, it is preferable that the difference between the thermal expansion coefficient of the top coat 103 and the thermal expansion coefficient of the substrate 101 including the bond coat 102, which is the base of the top coat 103, is $3 \times 10^{-6}$/K or less (at room temperature to 1200° C.). In order to allow the difference in the thermal expansion coefficient to be in the above-mentioned range, the mixing ratio of the rare earth disilicate and the rare earth monosilicate is determined depending on the kind of substrate, the kind of rare earth disilicate, and the kind of rare earth monosilicate. At the time of preparing the spray powder, the raw material powders are weighed and mixed with each other so as to have the mixing ratio.

Figure 6:
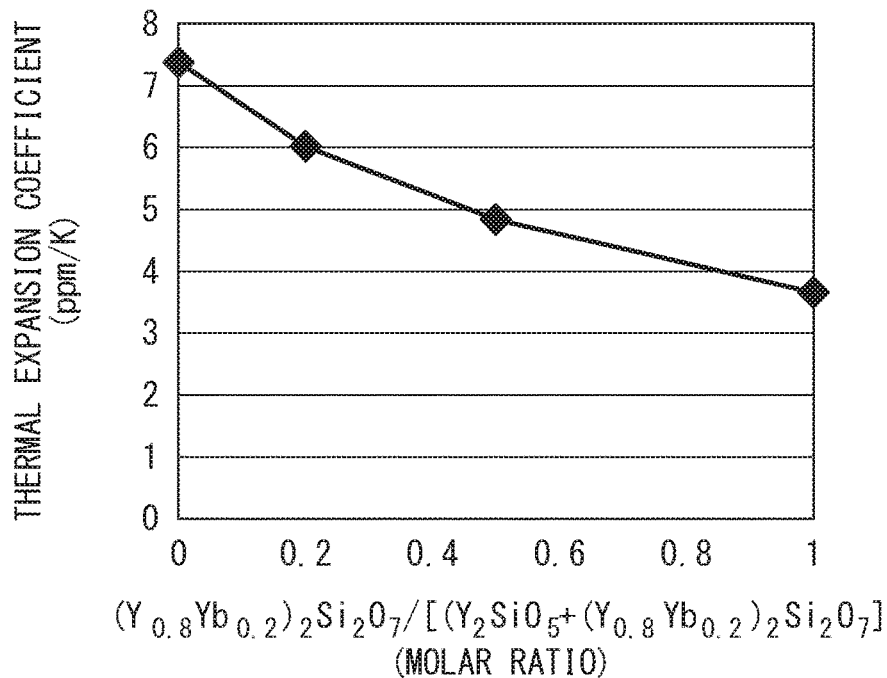
FIG. 6 is a graph illustrating a relationship between a mixing ratio of a rare earth disilicate and a rare earth monosilicate and a thermal expansion coefficient.

FIG. 6 is a graph illustrating a relationship between a mixing ratio of a rare earth disilicate and a rare earth monosilicate and a thermal expansion coefficient. FIG. 6 illustrates an example in which $(Y_{0.8}Yb_{0.2})_2Si_2O_7$ is used as the rare earth disilicate, and $Y_2SiO_5$ is used as the rare earth monosilicate. In FIG. 6, a horizontal axis indicates a ratio of $(Y_{0.8}Yb_{0.2})_2Si_2O_7$ in a solid solution $((Y_{0.8}Yb_{0.2})_2Si_2O_7 + Y_2SiO_5)$, and a vertical axis indicates a thermal expansion coefficient of the solid solution (at room temperature to 1200° C.).

The thermal expansion coefficient of the rare earth monosilicate is larger than that of the rare earth disilicate. Therefore, as illustrated in FIG. 6, as the mixing ratio of the rare earth disilicate is increased, the thermal expansion coefficient is decreased. Since a thermal expansion coefficient of a SiC fiber-reinforced SiC composite member including a bond coat (Si) is $4 \times 10^{-6}$/K (at room temperature to 1200° C.), when the ratio of the rare earth disilicate is in a range of 0.05 to 0.85, the difference in thermal expansion coefficient can become $3 \times 10^{-6}$/K or less.

A top coat 103 having excellent steam resistance and thermal cycle durability can be obtained by mixing the rare earth disilicate having a thermal expansion coefficient relatively close to that of the substrate and the rare earth monosilicate having excellent steam resistance to form the solid solution as described above. A composition of the top coat 103 can be uniform by forming the top coat 103 using the spray particles made of the solid solution in advance.

Since in the top coat 103, the rare earth disilicate does not remain in an un-reacted state, excellent steam resistance can be secured.

Second Embodiment

Figure 7:
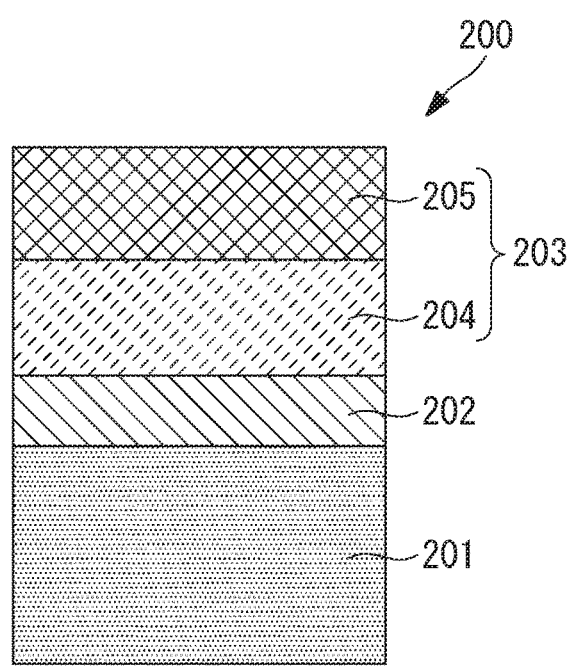
FIG. 7 is a schematic cross-sectional view of a coated member according to a second embodiment.

FIG. 7 is a schematic cross-sectional view of a coated member according to a second embodiment. In a coated member 200 according to the second embodiment, a bond coat 202 and a top coat 203 are sequentially laminated on a substrate 201, wherein the top coat 203 is composed of two layers.

The substrate 201 and the bond coat 202 are made of the same materials as those in the first embodiments. A first layer 204 of the top coat 203 is made of the same material as that of the top coat 103 according to the first embodiment, and has the same film thickness as that of the top coat 103 according to the first embodiment.

The second layer 205 of the top coat 203 is made of a rare earth monosilicate represented by $Re_2SiO_5$. Re is one of rare earth elements or a plurality of rare earth elements can be selected. For example, the second layer 205 can be made of $Y_2SiO_5$, $Yb_2SiO_5$, $Lu_2SiO_5$, $(Y, Yb)_2SiO_5$, $(Y, Lu)_2SiO_5$, or the like. Considering raw material cost, it is preferable that the second layer 205 is made of $Y_2SiO_5$ or a composite oxide, $(Y, Re')_2SiO_5$ (here, Re' is another rare earth element except for Y) in which Y is partially substituted with another rare earth element. In view of preventing concentrations of rare earth elements from being changed by interdiffusion with the first layer 204, it is preferable that a substitution element Re' is selected from Yb, Lu, Sc, Nd, Sm, Eu, and Gd. Particularly, it is preferable that the substitution element Re' is the same material as the rare earth element contained in the first layer 204. Considering raw material cost, it is preferable that a substitution amount of Re' is 0.5 or less.

The second layer 205 is formed by a spray method similarly to the first layer 204. A thickness of the second layer 205 is 50 μm or more and 300 μm or less.

In the case of applying the composite oxide containing a rare earth element selected from the plurality of rare earth elements to the second layer 205, particles solid-solubilized by heat-treatment after weighing and mixing raw material powders so as to have a predetermined substitution ratio can be used as the spray particles. In this way, uniformity of the composition in the second layer 205 is secured.

In the present embodiment, it is preferable that a difference in thermal expansion coefficient between the first layer 204 and a base (the substrate 201 including the bond coat 202) is $3 \times 10^{-6}$/K (at room temperature to 1200° C.). It is preferable that a difference in thermal expansion coefficient between the first layer 204 and the second layer 205 is $3 \times 10^{-6}$/K (at room temperature to 1200° C.).

As described in the first embodiment, the material of the substrate 201 (and the bond coat 202), the kinds of rare earth monosilicate and rare earth disilicate and a mixing ratio therebetween in the first layer 204, and the material of the second layer 205 are selected so that the respective layers can satisfy the differences in thermal expansion coefficient.

Damage by steam erosion under a high temperature environment can be prevented by allowing the top coat 203 to be composed of two layers and forming a layer of the rare earth monosilicate having excellent steam resistance in an outermost layer as in the present embodiment.

EXAMPLE

Tables 3 and 4 illustrate examples of coated members using a SiC fiber-reinforced SiC matrix composite (Tyrannohex, Ube Industries, Ltd., thermal expansion coefficient: $4 \times 10^{-6}$/K (at room temperature to 1200° C.) as a substrate. Further, a difference in thermal expansion coefficient between a first layer and a base (a substrate including a bond coat) (at room temperature to 1200° C.), and a difference in thermal expansion coefficient between first and second layers (at room temperature to 1200° C.) are illustrated in Tables 3 and 4.

TABLE 3

| | | Example 1 | Example 2 | Example 3 | Example 4 | Example 5 |
|---|---|---|---|---|---|---|
| Top Coat | Second Layer | $Y_2SiO_5$ | $Y_2SiO_5$ | $Y_2SiO_5$ | $Y_2SiO_5$ | — |
| | First Layer (Molar Ratio) | $0.2(Y_{0.8}Yb_{0.2})_2Si_2O_7 + 0.8Y_2SiO_5$ | $0.5(Y_{0.8}Yb_{0.2})_2Si_2O_7 + 0.5Y_2SiO_5$ | $0.2(Y_{0.8}Yb_{0.2})_2Si_2O_7 + 0.8Y_2SiO_5$ | $0.5(Y_{0.8}Yb_{0.2})_2Si_2O_7 + 0.5(Y_{0.8}Yb_{0.2})SiO_5$ | $0.5(Y_{0.8}Yb_{0.2})_2Si_2O_7 + 0.5(Y_{0.8}Yb_{0.2})SiO_5$ |
| | Bond Coat | Si | Si | Si | Si | Si |
| | Difference in Thermal Expansion Coefficient between First and Second Layers ($\times 10^{-6}$/K) | 1.3 | 2.5 | 1 | 2.2 | — |
| | Difference in Thermal Expansion Coefficient between First Layer and Base ($\times 10^{-6}$/K) | 2 | 0.85 | 2 | 0.85 | 0.85 |

TABLE 4

| | | Example 6 | Example 7 | Example 8 | Comparative Example 1 | Comparative Example 2 |
|---|---|---|---|---|---|---|
| Top Coat | Second Layer | $Y_2SiO_5$ | $Y_2SiO_5$ | $Gd_2SiO_5$ | $Y_2SiO_5$ | — |
| | First Layer (Molar Ratio) | $0.2(Y_{0.8}Gd_{0.2})_2Si_2O_7 + 0.8(Y_{0.8}Gd_{0.2})_2SiO_5$ | $0.5(Y_{0.8}Gd_{0.2})_2Si_2O_7 + 0.5(Y_{0.8}Gd_{0.2})_2SiO_5$ | $0.2(Y_{0.8}Gd_{0.2})_2Si_2O_7 + 0.8(Y_{0.8}Gd_{0.2})_2SiO_5$ | $Y_2Si_2O_7$ | $Y_2SiO_5$ |
| | Bond Coat | Si | Si | Si | Si | Si |
| | Difference in Thermal Expansion Coefficient between First and Second Layers ($\times 10^{-6}$/K) | 1.3 | 2.6 | 2.6 | 3.7 | — |
| | Difference in Thermal Expansion Coefficient between First Layer and Base ($\times 10^{-6}$/K) | 2.2 | 0.9 | 2.2 | 0.3 | 3.4 |

As illustrated in Tables 3 and 4, since in Examples 1 to 8, differences in thermal expansion coefficients between the respective layers were $3 \times 10^{-6}$/K or less, thermal stress in the top coat was alleviated. Therefore, thermal cycle durability can be improved as compared in Comparative Examples 1 and 2 in which the difference in thermal expansion coefficient was more than $3 \times 10^{-6}$/K.

The invention claimed is:

1. A method of manufacturing a coated member, the method comprising:

forming a bond coat consisting of at least one of silicide or mullite on a substrate made of a Si-based ceramic or a SiC fiber-reinforced SiC matrix composite; and forming a top coat on the bond coat, wherein the forming of the top coat includes:

preparing spray particles by mixing rare earth disilicate powder made of a $(Y_{1-a}Ln_{1a})_2Si_2O_7$ solid solution (here, $Ln_1$ is any one of Nd, Sm, Eu, and Gd, a is 0.1 or more and 0.5 or less when $Ln_1$ is Nd, Sm, or Eu, and a is 0.2 or more and 0.5 or less when $Ln_1$ is Gd) and rare earth monosilicate powder made of $Y_2SiO_5$ or a $(Y_{1-b}Ln_{1'b})_2SiO_5$ solid solution (here, $Ln_{1'}$ is any one of Nd, Sm, Eu, and Gd, and b is more than 0 and equal to or less than 0.5) to each other; and forming a first layer composed of a mixed phase of the rare earth disilicate and the rare earth monosilicate by spraying the spray particles on a surface of the bond coat.

2. A method of manufacturing a coated member, the method comprising:

forming a bond coat consisting of at least one of silicide or mullite on a substrate made of a Si-based ceramic or a SiC fiber-reinforced SiC matrix composite; and forming a top coat on the bond coat,
wherein the forming of the top coat includes:
preparing spray particles by mixing rare earth disilicate powder made of a $(Y_{1-c}Ln_{2c})_2Si_2O_7$ solid solution (here, $Ln_2$ is any one of Sc, Yb, and Lu, c is 0.05 or more and 0.5 or less when $Ln_2$ is Sc, and c is 0.1 or more and 0.5 or less when $Ln_2$ is Yb or Lu) and rare earth monosilicate powder made of $Y_2SiO_5$ or a $(Y_{1-d}Ln_{2'd})_2SiO_5$ solid solution (here, $Ln_{2'}$ is any one of Sc, Yb, and Lu, and d is more than 0 and equal to or less than 0.5); and
forming a first layer composed of a mixed phase of the rare earth disilicate and the rare earth monosilicate by spraying the spray particles on a surface of the bond coat.

3. The method of claim 1, wherein the forming of the top coat includes forming a second layer by spraying particles made of $Re_2SiO_5$ (here, Re is a rare earth element) on a surface of the first layer.

4. The method of claim 1, wherein the rare earth disilicate powder and the rare earth monosilicate powder are mixed at a mixing ratio at which a difference between a thermal expansion coefficient of the substrate on which the bond coat is laminated and a thermal expansion coefficient of the first layer is $3\times10^{-6}$/K or less.

5. The method of claim 3, wherein the rare earth disilicate powder and the rare earth monosilicate powder are mixed at a mixing ratio at which a difference between a thermal expansion coefficient of the first layer and a thermal expansion coefficient of the second layer is $3\times10^{-6}$/K or less.

6. The method of claim 2, wherein the forming of the top coat includes forming a second layer by spraying particles made of $Re_2SiO_5$ (here, Re is a rare earth element) on a surface of the first layer.

7. The method of claim 2, wherein the rare earth disilicate powder and the rare earth monosilicate powder are mixed at a mixing ratio at which a difference between a thermal expansion coefficient of the substrate on which the bond coat is laminated and a thermal expansion coefficient of the first layer is $3\times10^{-6}$/K or less.

8. The method of claim 6, wherein the rare earth disilicate powder and the rare earth monosilicate powder are mixed at a mixing ratio at which a difference between a thermal expansion coefficient of the first layer and a thermal expansion coefficient of the second layer is $3\times10^{-6}$/K or less.

9. A method of manufacturing a coated member, the method comprising:
forming a bond coat on a substrate made of a Si-based ceramic or a SiC fiber-reinforced SiC matrix composite; and
forming a top coat on the bond coat,
wherein the forming of the top coat includes:
selecting a rare earth element having an ionic radius in which phase transformation of a crystal structure of a rare earth disilicate does not occur in a predetermined temperature range, on a basis of a relationship between the crystal structure, the ionic radius, and a temperature of the rare earth disilicate,
preparing spray particles by mixing solid solution rare earth disilicate powder and solid solution rare earth monosilicate powder, and
forming a first layer composed of a mixed phase of the rare earth disilicate and the rare earth monosilicate by spraying the spray particles on a surface of the bond coat,
the preparing spray particles uses the rare earth disilicate powder in which Ln and Y are mixed so as to have a composition in which an average ionic radius of a rare earth element is the ionic radius in which phase transformation of the crystal structure does not occur in the predetermined temperature range, and
the Ln is any one of Nd, Sm, Eu, Gd, Sc, Yb, and Lu.

* * * * *